Patented Aug. 11, 1925.

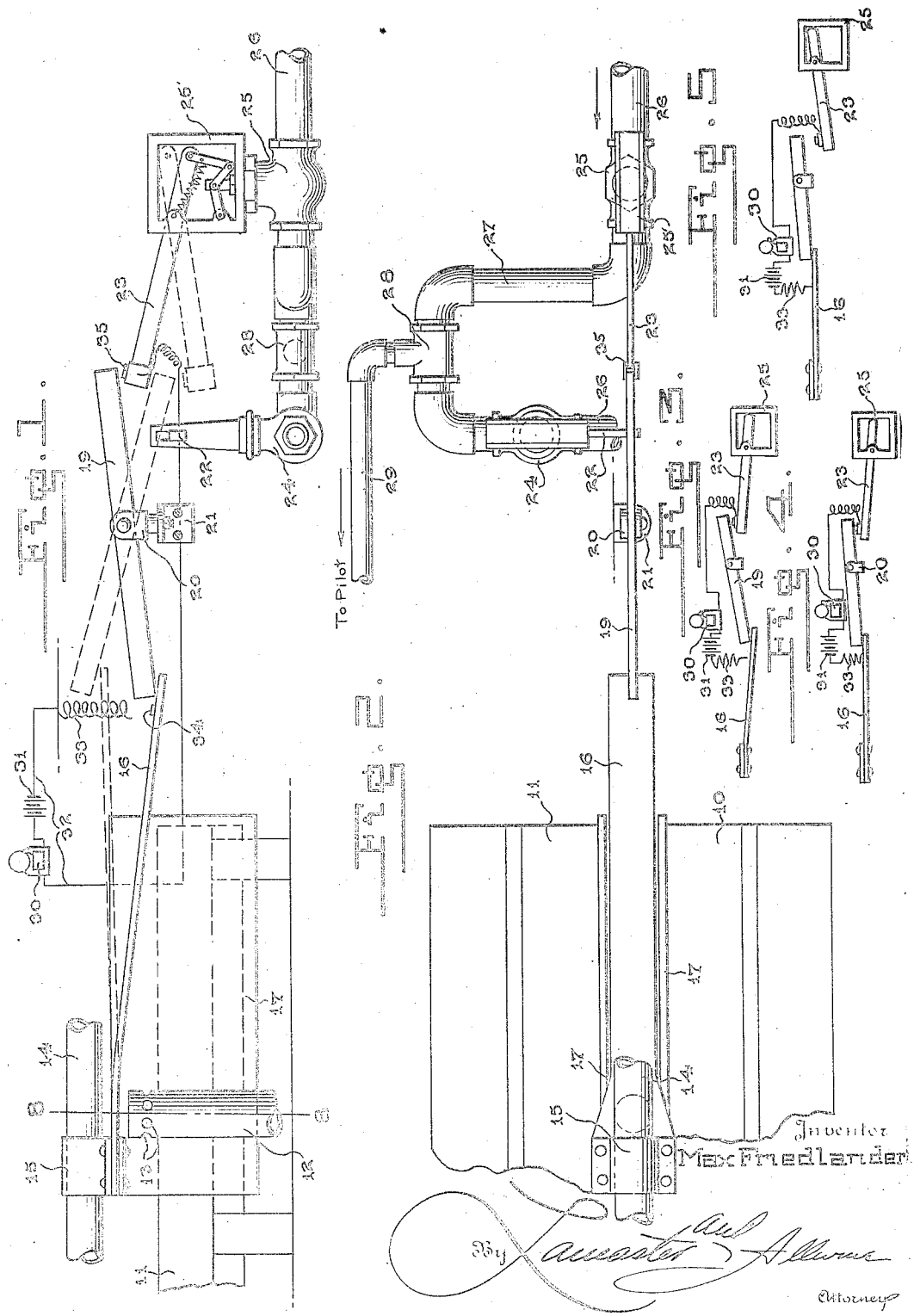

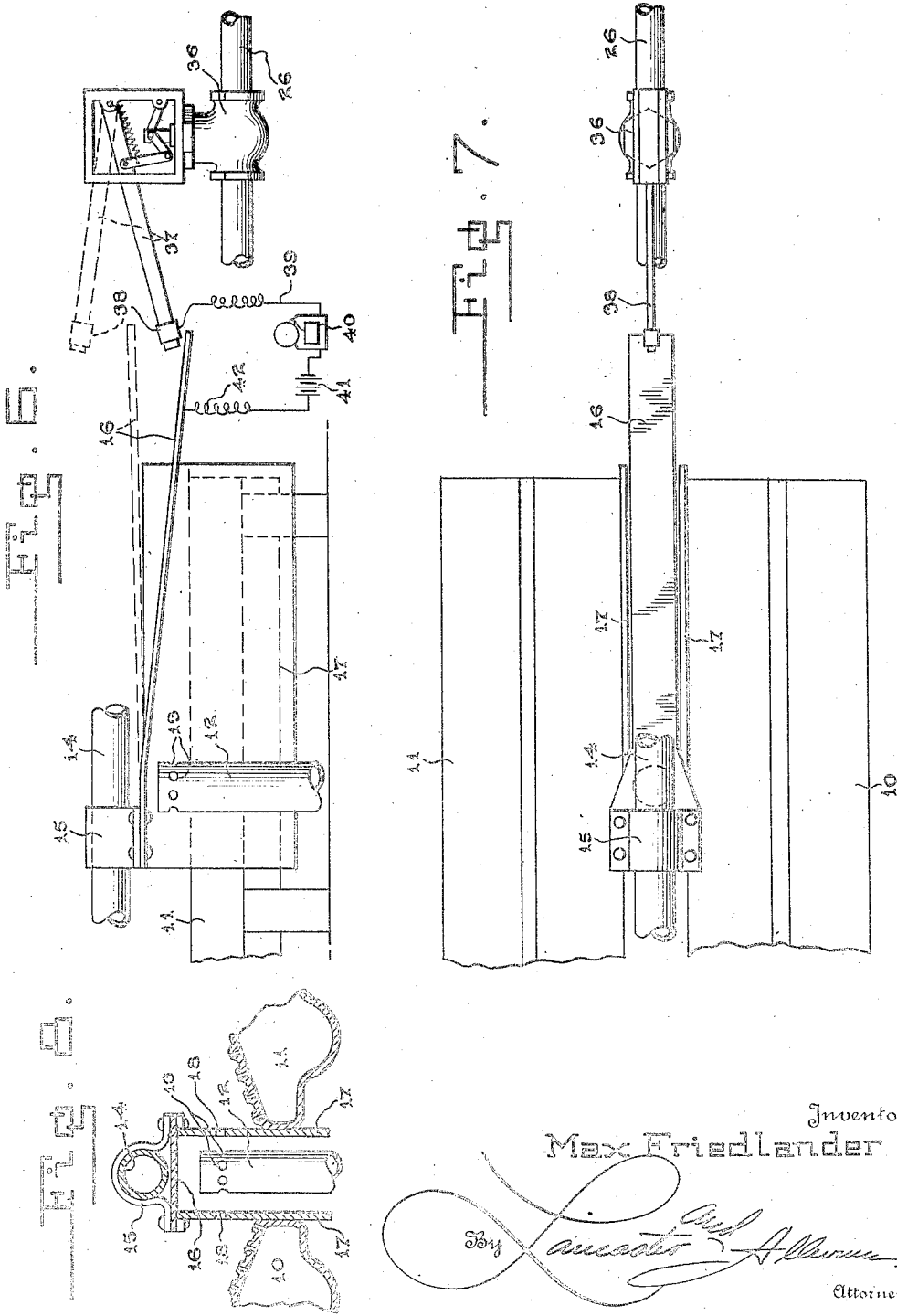

1,548,939

UNITED STATES PATENT OFFICE.

MAX FRIEDLANDER, OF YONKERS, NEW YORK.

CONTROLLING DEVICE FOR FUEL BURNERS.

Application filed October 16, 1923. Serial No. 668,944.

*To all whom it may concern:*

Be it known that I, MAX FRIEDLANDER, a citizen of the United States, residing at Yonkers, in the county of Westchester and State of New York, have invented certain new and useful Improvements in Controlling Devices for Fuel Burners, of which the following is a specification.

The present invention relates to fuel burners, particularly gas burners, and more particularly to an automatic control of the main and pilot burners to prevent escape of gas.

An object of the present invention is to provide thermostatic means controllable by the pilot to close off the flow of gas when the pilot cools the thermostatic metal by reason of the flame being extinguished, and for maintaining the flow of gas cut off until the pilot has been relighted and the thermostatic metal heated to the desired temperature.

Another object of the invention is to provide a thermostatic alarm which is automatically set in signalling position when the pilot extinguishes and maintained in such position until the flow of gas is entirely cut off, and which is so associated with the automatic valve control as to be operable thereby and in timed relation with the automatic closing and opening of the valve.

The invention further aims at the provision of an auxiliary or supplemental gas control valve for cutting off the entire flow of gas to the apparatus, and which is connected to the automatic means for actuation thereby to prevent accumulation of gas at the pilot and main burners so that explosion cannot occur when the pilot is relighted.

The invention further provides a means of protection for the thermostatic device to prevent the undue heating thereof by the main burners so that the thermostatic device may be located in the most effective position above the pilot and the pilot remain in a position close to the one or more main burners of the apparatus.

A still further object of this invention is to provide a device possessing all of the above characteristics and which at the same time comprises relatively few parts capable of economical manufacture and easy installation in connection with the burners and their apparatus already installed.

It is also an object of this invention to provide either a transmission lever which may be interposed between the actuator and the valves, or which may be omitted to reversely operate the burner valve when the latter operates reversely to that used with the transmission lever.

Another object is to provide a main controlling valve which becomes automatically locked in closed position after the emergency valve has been closed by the automatic device.

The above and various other objects and advantages of this invention will be in part described in and in part understood from the following detailed description of the present preferred embodiment, the same being illustrated in the accompanying drawings, wherein.

Fig. 1 is a side elevation, partly broken away, of a burner apparatus having the improved automatic controlling device of this invention applied thereto, the full lines showing the position of the parts when the thermostatic bar is heated, and the dotted lines showing the parts when the pilot light is out.

Fig. 2 is a top plan view of the same.

Fig. 3 shows diagrammatically the normal position of the attachment when the pilot is burning properly, and where the transmission lever is out of contact with the valve and the alarm circuit.

Fig. 4 is a similar view showing the parts in their initial position after the pilot has been extinguished and wherein the alarm is operating and the valve is about to be closed.

Fig. 5 is a like view showing the parts after the valve is closed and the signal circuit open and the fuel supply cut off.

Fig. 6 is a side elevation of a burner having a slightly modified controlling device.

Fig. 7 is a plan view of the same.

Fig. 8 is a transverse section taken through the burner and pilot housing substantially on the line 8—8 of Fig. 1.

Referring to the drawings and particularly to Fig. 8, 10 and 11 designate a pair of burners which may be of any suitable size or configuration, and may comprise any number of sections. The burners 10 and 11 are spaced apart and a pilot burner 12 is placed between the burners 10 and 11 and may be in the form of a pipe which rises between the burners and has lateral openings 13 through which jets of gas may be projected, to ignite the burners. A supporting pipe 14 is arranged above the burners and longitudinally between the same. A strap hanger 15 is mounted on the pipe 14 and carries a thermostatic bar 16 secured at one end to the strap 15 beneath the pipe 14 and extends lengthwise of the pipe to a suitable position beyond the ends of the burners 10 and 11.

The strap hanger 15 carries a pair of protector plates 17 which lie at opposite sides of the pilot 12 and between the burners 10 and 11. These plates have openings 18 therein opposite the openings 13 of the pilot 12, and through which flame passes to the main burners 10 and 11 for lighting the same.

This thermostatic bar 16 when cold is adapted to assume the horizontal position shown in dotted lines in Fig. 1, and when heated is adapted to assume the downwardly inclined position shown in full lines in Fig. 1. The outer end of the bar 16 may receive and hold the inner end of a transmission bar 19 placed in an edgewise upright position and pivoted in a bracket 20 which is fastened to a suitable support 21 adjacent the burner device. The bar 19 has one arm which engages the bar 16, and has its other arm extending over the upper edges of valve rods 22 and 23 of a burner valve 24 and an auxiliary or emergency valve 25.

The main supply pipe 26 leads into the valve 25 and inwardly of the valve 25 may be looped as at 27 and provided with a T coupling 28 or the like from which a pipe 29 leads to the pilot burner 12. Beyond the pipe 29, the main supply pipe is provided with a burner valve 24 as above described so as to control the flow of gas through the main pipe 26 to the burners 10 and 11.

The valves 24 and 25 are of the quick closing snap type which require but a slight initial movement of their valve rods 22 and 23 to move the same past center and permit the valves to snap either into open or closed positions. These valves are shown generally in the accompanying drawings and it is thought that further description is unnecessary as this type of valve is well known in the art.

From Fig. 1 it will be noted that the transmission lever 19 is so tilted when the thermostatic bar 16 is heated that the valve rods 22 and 23 may be elevated by hand without being restricted in movement by the outer end of the transmission bar 19. It will also be noted that the valve rod 22 is lower than the valve rod 23 and is positioned closer to the bracket support 20 for the transmission bar 19 to insure the initial closing of the valve 25 before the burner valve 24 is closed. This arrangement is had because when relighting the pilot 12 the operator first lifts the valve rod 23 of the emergency valve 25 by turning the frame 25' of the standard snap valve 25 outwardly away from the transmission lever 19 to open the valve and admit gas through pipe 26 and to the pilot pipe 29. The valve 24 having been closed and locked by the lever 19 does not permit a free flow of the gas to the burners 10 and 11 so that an explosion is averted. However after the pilot has become sufficiently hot to actuate the thermostatic bar 16 and lower it, the operator may snap the valve rod 22 upwardly and turn on the main burners 10 and 11. Of course it is understood that the pipe 26 may be provided with any suitable burner control devices between the valve 24 and the burners, or elsewhere in the system to regulate the turning off and on of the main burners.

It is desired, upon the going out of the pilot 12 to first sound an alarm or give a suitable signal which may sound or operate for a short time before the entire supply of gas is cut off. For this purpose a bell 30 may be employed and which is in circuit with a battery 31 by wires 32. One wire 32 is connected to a flexible contact 33 which overhangs the outer end portion of the thermostatic bar 16 and is adapted to be engaged by contact 34 carried by the bar 16 in position to engage the flexible contact 33 as the thermostatic bar 16 cools and rises.

The other wire 32 of the circuit leads to an insulated contact 35 mounted on the outer end of the valve rod 23 in position to strike the transmission lever 19 after the same has moved through a short distance so as to include the transmission lever 19 in the circuit and also the outer end of the thermostatic bar 16. It will be thus seen that it is necessary for the contacts 33 and 34 to come together and the contact 35 and the transmission lever 19 to come together for closing the circuit and operating the signal 30.

From Figs. 3, 4 and 5, the operation is as follows. In Fig. 3 the thermostatic bar 16 is heated and the transmission lever 19 is so tilted that the circuit through the bell 30 is broken and the valve rod 23 is in raised position below the transmission lever. Fig. 4 shows the thermostatic bar 16 partly cooled and raised through a short distance. This initial movement of the bar 16 has closed the electric circuit and has initially depressed the valve rod 23 to such point that the valve 25 is about to snap closed.

Fig. 5 shows the thermostatic bar 16 in fully raised and cooled position and wherein the circuit of the signal 30 is broken and the valve 25 is closed with its valve rod 23 in lowered position. When the valve 25 is closed no gas can pass through the pipe 26 so that both the pilot and the main burner are cut off from the gas supply. After the valve 25 has been closed the burner valve 24 is then snapped shut so as to cut off the main burners from the supply of gas, even when the valve 25 has been manually opened to relight the pilot.

In Fig. 6 is shown a slight modification wherein the transmission lever 19 and its parts are omitted and a snap valve 36 is mounted in the supply pipe 26 to control the flow of gas therethrough. The valve 36 has a rod 37 which operates reversely to the rod 23 and which is adapted to shut off the valve when the rod 37 is snapped upwardly into closed position. The free end of the rod 37 is adapted to overhang the end of the thermostatic bar 16 and be normally spaced therefrom as shown in Figure 6, and carries a contact piece 38 connected by wire 39 to a bell or signalling device 40 which is in circuit with a battery 41 having a lead wire 42 which is connected to the thermostatic bar 16. It is evident that a slight rise of the thermostatic bar 16 closes the circuit of the bell 40 and actuates the same until the thermostatic bar is cooled and straightened to such extent as to lift the rod 37 a distance sufficient to snap the valve 36 into closed position whereupon contact is broken again.

It is apparent that various changes and modifications may be made in the size, proportions, construction and design of the parts of the above specifically described embodiment of this invention without departing from the spirit thereof, these changes and modifications being restricted by the scope of the following claims.

What is claimed is:

1. In an automatic control for gas burners having a pilot burner, a thermostatic bar arranged between the main burners and over the pilot burner, a casing enclosing the thermostatic bar and the pilot burner from the main burners and having lateral openings therein for igniting the main burners from the pilot burner, a transmission bar pivoted adjacent to the thermostatic bar and having one end bearing thereagainst, a shut off valve having quick opening and closing mechanism and including a valve rod arranged in the path of the other end of said transmission bar adapted to be advanced toward a closed position sufficiently for quickly closing the burner valve when the thermostatic bar is cooled to a predetermined extent.

2. In an automatic control for gas burners having a pilot burner, a thermostatic bar, a transmission bar having one end bearing against the thermostatic bar, a gas controlling valve of the quick closing type having an operating rod arranged in the path of the other end of the transmission bar, an electric signalling device, a closing contact in circuit with one side of the signalling device and arranged to engage the thermostatic bar as the latter is cooled, and a second contact in circuit with the opposite side of the signalling device carried by said valve rod and adapted to be closed when said transmission bar is swung into engagement with the valve rod and adapted to be opened after a predetermined movement of the valve rod by the automatic quick closing action of the valve.

3. In an automatic control for gas burners having a pilot burner, a thermostatic device arranged adjacent to the pilot burner, a transmission lever operatively engaging said device for movement thereby as said device is cooled, a quick closing valve for the burners having a valve rod adapted to be engaged and initially moved by the transmission member and adapted to move away from said member by the quick closing action of the valve, a signalling device, a contact in circuit with one side of the signalling device for engagement with said thermostatic device when cooled and to remain in contact therewith throughout its movement, and a second contact in circuit with the other side of the signalling device and with said valve rod adapted to be closed through the transmission member when in engagement with the valve rod to operate the signalling device and adapted to be opened by the quick closing of the valve for stopping the operation of the signalling device.

4. In a burner device having main and pilot burners, a thermostatic bar adapted to be heated by the pilot burner, a fuel supply pipe, a quick closing valve in said pipe having a valve rod adapted to be operated by said thermostatic bar to an extent sufficient to trip the valve for closing, and an electric circuit including a signalling device and a contact mounted on the valve rod for controlling the closing of the circuit during the initial tripping of the valve and for opening the circuit after the valve is closed.

5. In combination a gas conduit, a burner for the gas conduit, a valve for regulating the supply of gas to the burner, said valve being of the quick acting type and including a snap lever which when moved in either direction past its dead center will quickly move farther in the direction of initial movement, a transmission lever pivoted intermediate its ends, a thermostatic element located adjacent said burner so as to be movably affected by temperature variation existing adjacent the burner, said transmission lever at one side of its pivot being adapted to cooperate with the movable end of the valve lever and at its other end being adapted to cooperate with the movable portion of the thermostatic element, and a signalling circuit being connected at one portion to the lever of said valve and at another portion cooperating with said thermostatic element whereby when the thermostatic element is heated the last mentioned portion will be out of contact with the thermostatic element and when the thermostatic element is cooled it will engage said last mentioned circuit portion, the circuit including said transmission lever; said transmission lever being out of engagement with the valve lever when the thermostatic element is heated by the burner whereby to open the signalling circuit.

MAX FRIEDLANDER.